UNITED STATES PATENT OFFICE.

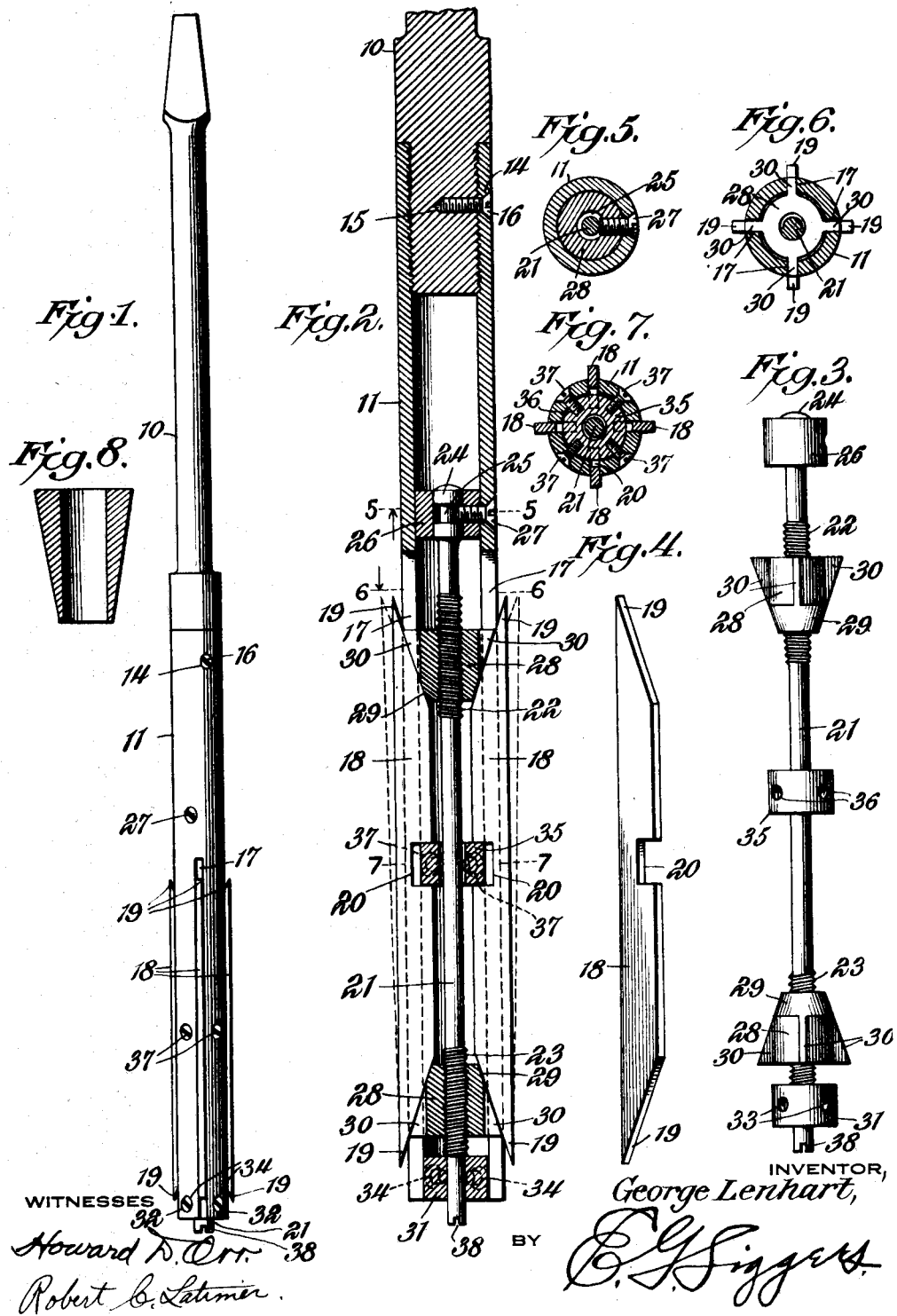

GEORGE LENHART, OF EUFAULA, OKLAHOMA.

EXPANDING REAMER.

1,389,519.   Specification of Letters Patent.   Patented Aug. 30, 1921.

Application filed September 20, 1919. Serial No. 325,122.

*To all whom it may concern:*

Be it known that I, GEORGE LENHART, a citizen of the United States, residing at Eufaula, in the county of McIntosh and State of Oklahoma, have invented a new and useful Expanding Reamer, of which the following is a specification.

This invention relates to reamers of the expanding type.

It is the special object of the invention to furnish a reamer which may be adjusted to ream out various sized holes, both straight and tapered.

Another object is to provide a reamer which can be used on various types of drills or lathes.

The invention is particularly designed for automobile and other fine machinery work, but is a useful tool for reaming all kinds of bushings, bearings, and holes of whatever nature.

For a complete comprehension of the construction and operation of the reamer, reference should be made to the drawing accompanying and forming a part of this specification, with the understanding, however, that the illustrated construction may be modified and departed from, provided such modifications lie within the scope of the appended claims.

In the drawing—

Figure 1 is an elevation of the reamer complete;

Fig. 2 is a longitudinal sectional view on an enlarged scale, most of the shank being omitted;

Fig. 3 is an elevation of the interior parts of the reamer which are operated to expand and lock the blades;

Fig. 4 is a perspective view of a blade;

Fig. 5 is a cross section on the line 5—5 of Fig. 2;

Fig. 6 is a cross section on the line 6—6 of Fig. 2; and

Fig. 7 is a cross section on the line 7—7 of Fig. 2.

Fig. 8 is a detail view of the conical follower plug.

The numeral 10 designates a shank or stock of any conventional form which may be adaptable to a drill press, hand drill or a lathe. This shank fits into a hollow shell or stem 11 forming the body of the reamer proper. Preferably, the shank has a reduced exteriorly screw threaded portion over which an interiorly threaded portion of the hollow stem 11 may be passed. Locking means for the stem and shank consisting of alined threaded bores 14 and 15 in the two respective parts, and a screw 16 entering both bores removably secures the stem to the shank.

The hollow stem is provided with a series of slots 17 extending from the free or front end of the stem about two-thirds the length thereof. The slots run longitudinally, are cut radially and are of a length and width somewhat greater than that of blades 18 which they are designed to receive. The blades have sharply tapering ends 19 as shown, with square recesses 20 in the middle extending from their inner edges.

The blade-adjusting mechanism is shown particularly in Figs. 2 and 3. It consists of a long adjusting bolt 21 having right and left hand screw threaded portions 22, 23, lying near either end and separated by a plain or unthreaded section. The inner end of the adjusting bolt has a head 24 provided with an annular groove 25. A collar 26 having a central bore fits over the head 24 and within the stem 11. A locking screw 27 is seated in the stem and extends through the collar 26 into the groove 25 as Figs. 2 and 5 disclose. The arrangement is such that the collar holds the inner end of the adjusting bolt in the center of the stem and free to rotate, and the screw 27 holds the collar from movement in any direction and locks the adjusting bolt at will.

Two conical blocks 28 are mounted on the adjusting bolt and have central threaded bores so that both will engage with the threaded portions 22, 23 of the bolt. Each conical block has a tapered end 29 and also wings 30 adapted to extend into the slots 17 of the stem. The blocks normally have their smaller ends facing each other and engage the tapered ends 19 of the blades, said tapered ends bearing upon the wings. With the wings 30 lying within the slots and the blocks held from rotary movement, it is clear that rotation of the adjusting bolt will cause the blocks to move longitudinally toward or from each other, because the threaded parts with which they engage are right and left handed.

The outer end of the bolt turns in a bearing formed by a collar 31 fitting loosely and flush within the stem. A series of threaded holes 32, one for each section of the stem between the slots, runs around the stem near the extreme outer end. Matching threaded holes 33 are provided in the collar 31, and screws 34 are run into these holes. When the screws 34 are tightened, the collar is held securely in place, thus providing a second and outer bearing for the rotatable bolt, besides acting as a stop for the outermost conical block. A collar 35 fits loosely over the central portion of the bolt and within the stem. This collar has screw holes 36, and the stem has similar holes to receive screws 37. When the latter are tightened, the slotted stem sections are moved inwardly, thus clamping the blades positioned in the slots. The cutaway sections 20 of the blades will fit about the collar 35. The outer end of the bolt has a slot 38 by which it may be turned with a screwdriver, or said end may be squared so as to be turned by a wrench.

The manner in which the invention is used and some of its advantages will now be explained.

Supposing the reamer to be adjusted and locked in the position of Fig. 2, and it is desired to adjust for a smaller bore: the lock screw 27 is first loosened, then the clamping screws 37. The adjusting bolt can now be turned freely in the proper direction to cause the conical blocks to spread apart. The blades may now be pushed inwardly until they bear once more against the blocks. Finally, the locking and clamping screws will be tightened. If a larger hole is to be reamed, the adjusting bolt will be turned to bring the blocks closer to each other, which will force the blades outwardly through the slots.

If a tapering hole is to be reamed, the adjusting bolt will be turned until the two blocks run off their threads. Now, either the lower or the upper block will be made to engage with the rotated bolt before the other one does. This may be done by removing one blade and using any instrument to push the block into engagement with its threads. With the two blocks on the bolt an unequal distance from the middle thereof, it is clear that the blades will assume positions in which their ends will project unequal distances out of the slots, as shown in dotted lines in Fig. 2. If the lower block is closer to the middle of the bolt than the upper block, the taper will be upwardly with respect to the tool as a cutting instrumentality; while if the upper block is closer, the taper will run downwardly. The degree of taper will depend on the relative relation between the positions of the two blocks. The closer to the center, or the farther removed one block is from the end, as compared with the other, the greater the taper.

In all positions of the blades, the blocks will support them at each end, with the wings 30 acting as a continuation of the tapered ends 29 for blade-supporting purposes. The clamping screws 37 will clamp the blades as long as they lie in the slots.

The principal advantages of the reamer are that it may not only be used in various types of machines to ream many sizes of straight holes, but it may also ream various sizes of tapered holes without elaborate adjustment. The taper may run either way and may be changed without removing more than one blade.

Various widths of blades may be used with the same tool and thus render it still more adaptable an instrument. Instead of straight blades, spiral blades may be used.

The device shown in Fig. 8 is employed for holding the reamer in the center when reaming a long hole or two short holes in line with each other. It is inserted over the stem and usually lies between the screw 16 and the slots 17, the small end of the cone facing toward the slots 17. It is a very useful and necessary part in performing certain classes of work, particularly on automobiles.

What is claimed is:—

1. In a reamer, a slotted stem, blades having tapered ends and fitting in the slots of the stem, and adjusting means within the stem for the blades, said adjusting means including blocks movable longitudinally of and within the stem and having wings extending into said slots for supporting the blades in adjusted position and for preventing rotation of said blocks within the stem.

2. In a reamer, a slotted stem, blades having tapered ends and fitting in the slots of the stem, and adjusting means within the stem for the blades, said adjusting means including blocks movable longitudinally of and within the stem and having wings extending into said slots, said blocks and said wings being uniformly tapered, thereby providing supporting surfaces for the tapered ends of the blades.

3. In a reamer, a hollow stem having longitudinal slots, blades positioned in the slots, said blades having central recesses at the inner edges thereof, means for adjusting the positions of the blades, and means for clamping the blades, said clamping means including a collar within the stem, and screws passed through the stem and engaging with the collar, the recesses of the blades fitting above the collar.

4. In a reamer, a hollow stem, an adjusting bolt within the stem, a centering collar at the outer end of the stem, a second collar within the stem surrounding the inner end of the bolt, and a locking screw operable from without the stem and engaging the second collar to hold it in place and when tightened locking the adjusting bolt.

5. In a reamer, blade adjusting means including a bolt, right and left screw-threaded portions on the bolt near the ends thereof and separated by a plain section of the bolt, blade engaging blocks mounted on said bolt and engageable with the threaded sections thereof either separately or simultaneously, the plain section of the bolt having a length greater than the combined length of the two blocks, said blocks when disengaged from the threaded sections being slidable along said plain section.

6. In a reamer, a slotted hollow stem, blades fitting in the slots of said stem and having tapered ends, a bolt having right and left hand threads near the ends, and an unthreaded portion between said threads, collars fixed within the stem forming supports and bearings for the ends of the bolt, blocks mounted within the stem to move on the threaded portions of the bolt, and wings on the blocks fitting in the slots of the stem and engaging the ends of the blades.

7. In a reamer, a slotted hollow stem, blades fitting in the slots of said stem and having tapered ends, a bolt having right and left hand threads near its ends, and an unthreaded portion between said threads, collars fixed within the stem forming supports and bearings for the ends of the bolts, one of the collars being located at the outer end of the stem, said bolt projecting beyond said collar so that it may be turned, the other collar being provided with means for locking the bolt from rotation, blocks mounted within the stem to move on the threaded portions of the bolts, and wings on the blocks fitting in the slots of the stem and engaging the ends of the blades.

8. In a reamer, a hollow stem having longitudinal slots extending to one end thereof, blades receivable in said slots, means for adjusting the positions of the blades within the slots, and means for clamping the blades whatever their positions, said clamping means comprising a collar housed within the stem, a screw passed through each section of the stem defined by two of the slots and engaging with the collar, whereby the stem sections may be drawn inwardly toward the collar to clamp the blades between them, a second collar mounted within the stem at the slotted end thereof, a bolt rotatable in both collars and coaxial with the stem, a pair of blocks mounted on the bolt near the ends thereof and movable longitudinally of the stem by rotation of the bolt, said blocks supporting the ends of the blades when received within the slots, the second named collar acting as a stop for the adjacent block, and screws passed through each slotted stem section and engaging with the second collar to hold the same in place.

In testimony, that I claim the foregoing as my own, I have hereto affixed my signature in the presence of two witnesses.

GEORGE LENHART.

Witnesses:
 CHARLES WHITAKER,
 BERTHA BLAINE.